United States Patent Office 3,179,631
Patented Apr. 20, 1965

3,179,631
AROMATIC POLYIMIDE PARTICLES FROM POLYCYCLIC DIAMINES
Andrew Laszlo Endrey, Parma, Ohio, assignor to E. I. du Pont de Nemours and Company, Wilmington, Del., a corporation of Delaware
No Drawing. Filed Jan. 26, 1962, Ser. No. 169,107
24 Claims. (Cl. 260—78)

This invention relates to novel polymeric materials and has as its primary object a novel method for the preparation of novel polyimide powders. Other objects will appear hereinafter.

This application is a continuation-in-part of my copending application Serial No. 803,348, filed April 1, 1959, now abandoned.

The resulting polyimides are characterized by a recurring unit having the following structural formula:

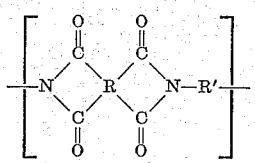

wherein R is a tetravalent radical containing at least one ring of six carbon atoms, said ring characterized by benzenoid unsaturation, the four carbonyl groups being attached directly to separate carbon atoms and each pair of carbonyl groups being attached to adjacent carbon atoms in a 6-membered benzenoid ring of the R radical; and wherein R' is a divalent polycyclic aromatic radical in which no more than one valence is located on any one aromatic ring and the powders of these polyimides are characterized by high surface areas, at least 0.1 square meter per gram, usually above 1 and preferably 2–500 square meters per gram.[1]

The polyimide powders, prepared by the process of the present invention, can be coalesced into articles that display outstanding physical and chemical properties which make them very useful.

The ability to coalesce these high surface area powders provides a unique method of obtaining thick objects free of solvents. The coalescence seems to be neither a molding operation such as is practiced with phenolics, polyamides, vinyl polymers, etc., nor a sintering operation such as is practiced with polytetrafluoroethylene since the conditions necessary for coalescene are so different. That is, coalescence results from a combination of heat and pressure, but occurs at a temperature below the crystalline melting point of the polyimide. In most cases, the crystalline melting points of these polyimides are above 500° C. Most of these polyimides degrade in the region of their crystalline melting points and, hence, cannot be fabricated in the molten state. Furthermore, the coalescene is a surface phenomenon since microscopic examination of the coalesced solid indicates that the structure and shape of the original particles have been disturbed but little.

The polyimides are prepared by reacting at least one organic diamine having the structural formula:

$$H_2N\text{---}R'\text{---}NH_2$$

wherein R' is a divalent, polycyclic aromatic radical in which no more than one valence bond is located on any

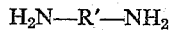
[1] As measured using the technique described by F. M. Nelsen and F. T. Eggerton, Anal. Chem. 30, 1387 (1958).

one aromatic ring; with at least one tetracarboxylic acid dianhydride having the structural formula:

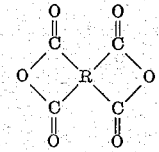

wherein R is a tetravalent radical containing at least one ring of six carbon atoms characterized by benzenoid unsaturation, the four carbonyl groups of said dianhydride being attached directly to different carbon atoms in a ring of the R radical and each pair of carbonyl groups being attached to adjacent carbon atoms in a 6-membered benzenoid ring of the R radical; in an organic solvent for at least one of the reactants, the solvent being inert to the reactants, preferably under anhydrous conditions, for a time and at a temperature below 175° C. sufficient to form "n" moles of a polyamide-acid, each mole containing "m" amide-acid linkages; precipitating the polyamide-acid by mixing with a precipitant for the polyamide-acid. The precipitant may be a non-solvent for the polyamide-acid, in which case the particulate solid precipitated is predominantly polyamide-acid. Alternatively, the precipitant may react with the polyamide-acid, e.g. a dehydrating agent, to precipitate an insoluble particulate solid that is predominantly polyimide.

When the particulate solid is predominantly polyamide-acid, i.e. a non-solvent is used as the precipitant, the polyamide-acid is converted to the polyimide by treating the polyamide-acid composition with "n" times "m" moles of a lower fatty monobasic acid anhydride, preferably acetic anhydride. Although the stoichiometric equivalent, based on the polyamide-acid, of the anhydride alone is operable in the present invention, it is preferred to have some of a tertiary amine, preferably pyridine, present as well. The ratio of the tertiary amine to anhydride may vary from zero to almost infinite mixtures with a 1:1 ratio being the most commonly used with tertiary amines having the activity of pyridine. The amine functions as a catalyst of the action of the cyclyzing agent, the anhydride.

Besides acetic anhydride, other operable lower fatty acid anhydrides include propionic, butyric, valeric, mixed anhydrides of these with one another and with anyhdrides of aromatic monocarboxylic acids, e.g. benzoic acid, naphthoic acid, etc., and with anhydrides of carbonic and formic acids, as well as aliphatic ketenes (ketene and dimethyl ketene). The preferred anhydrides are acetic anhydride and ketene. Ketenes are regarded as anyhdrides of carboxylic acids (ref. Bernthsen-Sudborough, textbook of Organic Chemistry, Van Nostrand, 1935, page 861, and Hackh's Chemical Dictionary, Blakiston, 1953, page 468) derived from drastic dehydration of the acids.

Tertiary amines having approximately the same activity as the preferred pyridine may be used in the process. These include 3,4-lutidine, 3,5-lutidine, 4-methyl pyridine, 3-methyl pyridine, 4-isopropyl pyridine, N-dimethyl benzyl amine, isoquinoline, 4-benzyl pyridine and N-dimethyl dodecyl amine. As mentioned previously, these amines are generally used in approximately equimolar amount with that of the anhydride converting agent. Trimethyl amine and triethylene diamine are much more reactive, and, therefore, are generally used in smaller amounts. On the other hand, the following operable amines are less reactive than pyridine: 2-ethyl pyridine, 2-methyl pyridine, triethyl amine, N-ethyl morpholine, N-methyl morpholine, N-diethyl cyclohexylamine, N-dimethyl cyclohexylamine, 4-benzoyl pyridine, 2,4-lutidine, 2,6-lutidine and 2,4,6-collidine, and are generally used in larger amounts.

It should be understood that precipitation with a reactant is preferably accomplished by using a conversion agent, e.g. a lower fatty monobasic acid anhydride, as the precipitant. As in the conversion step mentioned previously, it is preferred to use a mixture of the lower faty monobasic acid anhydride and a teritary amine in this precipitation step. The product of this step is a polymeric powder that is predominantly polyimide powder Completion of conversion may be effected by merely maintaining the anhydride in contact with the polymeric powder. However, it is preferred to complete conversion by heating the reaction mixture to an elevated temperature, preferably to a temperature above 200° C. but below the crystalline melting point of the polyimide.

It should also be understood that when precipitation is carried out using a non-solvent for the polyamide-acid as the precipitant, then conversion may be effected by heat treatment alone. In this step the particles of polyamide-acid having recurring unit of the following structural formula:

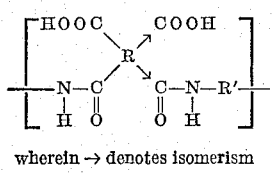

wherein → denotes isomerism are converted to particles of the corresponding polyimide by heating the polyamide-acid particles above 50° C., usually by raising the temperature gradually to above 200° C., preferably in the presence of a tertiary amine. Heating serves to convert pairs of amide and carboxylic acid groups to imide groups. Heating may be conducted for a period of a few seconds to several hours.

The precipitation and heating steps are usually carried out with concomitant agitation to insure that the ultimate polyimide has small particle size and a high surface area. The presence of the tertiary amine nucleophile during the heating step is desirable since it catalyzes the ring closure to the desired imide structure and thus promotes the formation of high molecular weight polyimides free from other less stable chemical structures.

It has also been found that after the polyamide-acid has been converted to the polyimide powder in accordance with the above described heat conversion or the previously described chemical conversion, if the polyimide powder is further heated to a temperature of 200° C.–500° C. for an interval of 15 seconds to 24 hours, improvements in the thermal and hydrolytic stabilities of the polyimide are obtained as well as an increase in inherent viscosity.

Other processes for conversion of the polyamide-acid powder after precipitation of the polyamide-acid from solution by the addition of a non-solvent involve the use of hot gases or infrared radiation. Still another process of conversion may involve combination treatments. Thus, the polyamide-acid powder may be partially converted to the polyimide powder in a chemical conversion treatment (anhydride treatment) and then cyclization to the polyimide may be completed by subsequent heat and/or infrared light treatment.

In determining a specific time and a specific temperature for forming the polyamide-acid of a specified diamine and a specified dianhydride in the first step of the process, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated. The particular temperature below 175° C. that must not be exceeded for any particular combination of diamine, dianhydride, solvent and reaction time to provide a reaction product composed of sufficient polyamide-acid to provide sufficient coalescible polyimide particles in the conversion step will vary but can be determined by a simple test by any person of ordinary skill in the art. However, to obtain the maximum inherent viscosity, i.e. maximum degree of polymerization, for any particular combination of diamine, dianhydride, solvent, etc., and thus produce polyimide particles of optimum utility, it has been found that the temperature throughout the reaction for forming the polyamide-acid should be maintained below 60° C., preferably below 50° C.

The details of one process for making the polyamide-acid involve premixing, without reacting, equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydride, the solvent may be added to the mixture with agitation. It is also possible to dissolve the diamine in the solvent while agitating, preheat the solution and then add the dianhydride at a sufficiently slow rate to control the reaction temperature. Ordinarily, in this latter process the last portion of the dianhydride is added with part of the organic solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions. The quantity of organic solvent used in the preferred process need only be sufficient to dissolve enough of one reactant, preferably the diamine, to initiate the reaction of the diamine and the dianhydride.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains. The use of pure reactants and pure solvents will also foster the formation of polyamide-acids, and subsequently polyimides, of high molecular weight. The use of pure materials is also important to prevent incorporation of chemically and/or thermally unstable materials in the ultimate polymer.

In the preparation of the polyamide-acid intermediate, it is essential that the molecular weight be such that the inherent viscosity of the polymer is at least 0.1, preferably 0.3–5.0. The inherent viscosity is measured at 35° C. at a concentration of 0.5% by weight of the polymer in a suitable solvent, e.g. N,N-dimethylacetamide. To calculate inherent viscosity, the viscosity of the polymer solution is measured relative to that of the solvent alone by measuring the times of flow of equal volumes through the capillary of a standard viscometer and using the following equation:

Inherent viscosity =

$$\frac{\text{natural logarithm} \frac{\text{Viscosity or time of solution}}{\text{Viscosity or time of solvent}}}{C}$$

where C is the concentration expressed in grams of polymer per 100 milliliters of solution. As known in the polymer art, inherent viscosity is directly related to the molecular weight of the polymer.

It should also be understood that instead of precipitating the polyamide-acid as a particulate solid before conversion, the polyamide-acid composition in the solvent may be used as a liquid coating composition and precipitated as a powder on the substratum. Such coating compositions may be pigmented with such compounds as titanium dioxide in amounts of 5-200% by weight. These coating compositions may be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. perfluorocarbon polymers such as polytetrafluoroethylene, copolymers of tetrafluoroethylene with hexafluoropropylene, etc. The polyamide-acid coatings precipitated on the substratum may then be converted to polyimide powder coatings by the process of this invention, which are then coalesced by additional heating.

The presence of polyimides is evidenced by their insolubility in cold NaOH solution as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption band appears, a doublet at ca. 5.64 and 5.89 microns and a peak at 13.85 microns. When conversion is completed, the characteristic polyimide band predominates. In some cases, one can also detect isoimide linkages, i.e.

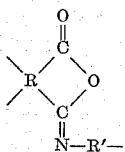

As stated previously, the particles of polyimides are characterized by surface areas of at least 0.1 square meter/gram, usually above 1 and preferably 2-500 square meters/gram. The inherent viscosity of the polyimide should be at least 0.1, preferably 0.3-5. The inherent viscosity is measured at 35° C. as a 0.5% solution in a suitable solvent. The solvent can be selected from the group consisting of concentrated (96%) sulfuric acid, fuming nitric acid, the monohydrate of dichlorotetrafluoroacetone and the monohydrate of monochloropentafluoroacetone. If the polyimide is not soluble in any of these solvents to the extent of 0.5% and if particles of the polyimide can be formed into a strong coalesced disk (strength index greater than 0.3) by the process described hereinafter, then its inherent viscosity may be considered to be greater than 0.1. To confirm this one may obtain the intrinsic viscosity. This viscosity is determined by measuring viscosity at several lower concentrations, plotting the values, and extrapolating to infinite dilution. The intrinsic viscosity, the viscosity at infinite dilution, for polyimides of this invention should also be above 0.1, preferably 0.3 to 5.

The starting materials for forming the products of the present invention are organic diamines and tetracarboxylic acid dianhydrides. The organic diamines are characterized by the formula: $H_2N-R'-NH_2$, wherein R', the divalent radical, is a polycyclic aromatic organic diradical in which the aromatic rings may be aromatic, heterocyclic, bridged radicals wherein the bridge is oxygen, nitrogen, sulfur, silicon or phosphorus, and substituted groups thereof or directly attached rings, e.g. biphenylene, naphthalene. The preferred R' groups in the diamines are those containing at least two rings, having 6 carbon atoms characterized by benzenoid unsaturation in each ring. Such R' groups include

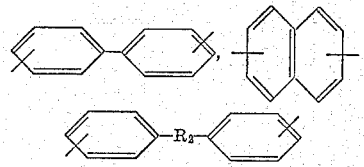

and

wherein $R_2$ and $R_3$ are selected from the group consisting of carbon in an alkylene chain having 1-3 carbon atoms, oxygen, silicon in

and

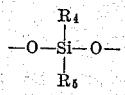

phosphorus in

and

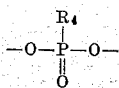

and sulphur alone or in $-SO_2-$ where $R_4$ and $R_5$ are alkyl and aryl. Among the diamines which are suitable for use in the present invention are:

4,4'-diamino-diphenyl propane;
4,4'-diamino-diphenyl methane;
4,4'-diamino-diphenylamine;
benzidine;
4,4'-diamino-diphenyl sulfide;
4,4'-diamino-diphenyl sulfone;
3,3'-diamino-diphenyl sulfone;
4,4'-diamino-diphenyl ether;
bis-(4-amino-phenyl)diethyl silane;
bis(4-amino-phenyl) phenyl phosphine oxide;
bis-(4-amino-phenyl)-N-methylamine;
1,5-diamino-naphthalene;
3,3'-dimethyl-4,4'-diamino-biphenyl;
3,3'-dimethoxy benzidine;
1,4-bis(p-aminophenoxy) benzene;
1,3-bis(p-aminophenoxy) benzene; and mixtures thereof.

The tetracarboxylic acid dianhydrides are characterized by the following formula:

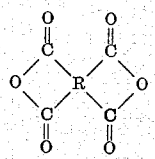

wherein R is a tetravalent organic radical selected from the group consisting of aromatic, aromatic heterocyclic, and substituted groups thereof. However, the preferred dianhydrides are those in which the R groups have at least 6 carbon atoms characterized by benzenoid unsaturation, i.e. resonating double bonds in an aromatic ring structure, wherein the 4 carbonyl groups of the dianhydride are each attached to separate carbon atoms and wherein the carbon atoms of each pair of carbonyl groups are directly attached to adjacent carbon atoms in a 6-membered benzenoid ring of the R group to provide a 5-membered ring as follows:

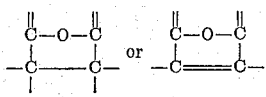

Illustrations of dianhyrides suitable for use in the present invention include: pyromellitic dianhyride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; bis(3,4-dicarboxyphenyl) ether dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; sulfone dianhydride; 3,4,3',4'-benzophenone tetracarboxylic dianhydride; etc., and mixtures thereof.

The inclusion of diamines or dinahydrides other than those disclosed may detract from one or more of the desirable properties of the polyimide of this invention. Aliphatic diamines and m- and p-phenylenediamines are examples of such materials. It is obvious that inclusion of small amounts (e.g. 0.1 to 15%) of such intermediates may modify the outstanding properties of the preferred compositions only to the degree that they are present, and such compositions therefore will still be useful and valuable for certain applications and are intended to be within the class of coalescible polyimide powders of this invention.

The solvents useful in the solution polymerization process for synthesizing the polyamide-acid compositions are the organic solvents whose functional groups do not react with either of the reactants (the diamines or the dianhydrides) to any appreciable extent. Besides being inert to the system and, preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than mono-functional primary and secondary amino groups, hydroxyl or thiol groups, and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,-N-dimethylformamide and N,N-dimethylacetamide. They may easily be removed from the polyamide-acid and/or polyimide powders by evaporation, displacement or diffusion. Other typical compounds of this useful class of solvents are: N,N-diethylformamide, N,N-diethylacetamide, N,N-dimethylmethoxyacetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide, butylrolactone. The solvents can be used alone, in combinations of solvents, or in combination with poor solvents such as benzene, benzonitrile, dioxane, xylene, toluene and cyclohexane.

In the precipitating step, it is preferred that the polyamide-acid solution is added to the precipitant for the polyamide-acid while agitating during the addition. As precipitants, one may use most of the lower fatty acid anhydrides, e.g. acetic anhydride, propionic anhydride, acetic propionic anhydride, ketene solutions, etc. or liquid hydrocarbons having at least three carbon atoms, e.g. n-octane, n-hexane, toluene, liquid propane, cyclohexane, tetralin, etc., or aliphatic ethers, e.g. diethyl ether.

When the precipitated polymeric powder is principally in the form of the polyamide-acid, the conversion step is accomplished either by heat treatment or treatment with sufficient lower fatty acid anhydride to convert the polyamide-acid to the polyimide. If the particular polymeric solid has been partially converted to polyimide prior to this step, then only enough anhydride to convert the unconverted polyamide-acid need be used. The minimum amount to provide complete conversion is the stoichiometric equivalent of the polyamide-acid present, i.e. "$n$"$\times$"$m$" moles of anhydride to convert "$n$" moles of polyamide-acid, each mole containing "$m$" amide-acid linkages. Ordinarily, a large excess of anhydride is used in the presence of a diluent.

The most useful diluent in the fatty acid anhydride conversion step is a tertiary amine, e.g. the previously-mentioned pyridine. However, other diluents may also be used with or without the tertiary amine. The list includes benzene, cyclohexane, chloroform, carbon tetrachloride, acetonitrile, benzonitrile, quinoline, dimethylaniline, dimethylcyanamide, tetramethylene sulfone and ethyl acetate. Primarily, the diluents promote better diffusion of the anhydride through the polyamide-acid structure.

The finely-divided, high surface area polyimides prepared according to this invention can be made to coalesce at temperatures below the crystalline melting point into solid, homogeneous objects under the influence of heat and pressure. The coalescing process requires the application of a pressure of from 3,000 to about 30,000 p.s.i. to the particulate polyimide after the particles have been heated to a temperature in the range of 200° to about 500° C., but below the crystalline melting point of the polyimide, prior to the application of pressure in excess of 5,000 p.s.i. The particulate polyimide can be heated to the requisite temperature either before or after it is placed in the mold. When the ultimate particle size is small and the surface area is large, a density of about 1.43 g./cm.$^3$ can be attained by coalescence which is about equal to that found in films prepared by casting polyamide-acid films and dehydrating. Although some deformation or flow of these polyimide particles is necessary to obtain coalescence such flow or deformation is extremely limited in these polyimide particles thereby making fabrication by conventional plastics-forming techniques impractical. We have found that fabrication by coalescence of disks 1.25 inches in diameter and about 0.085 inch in thickness provides convenient pieces for testing since the problems of reproducibility of fabrication conditions are reduced to a minimum. The force necessary to break these chips in flexure can be used as the criterion of integrity and quality of the fabricated piece and, therefore, of the usefulness of the original powder.

The strength of the polyimide disk fabricated in the optimum fashion is increased markedly in the case of the products described herein where the surface area of the powder is at least 0.1 square meter/gram. A further significant improvement results from increasing the inherent viscosity or the intrinsic viscosity of the polyimide to at least 0.5 and preferably higher. The strength of these disks is related to the usefulness of this polymer powder for a variety of applications. The powders which yield disks having strength indices below 1.4 may not be useful for certain mechanical applications, but are useful when coalesced in the form of electrical insulation for use at high temperatures or as thermal barriers where very high temperatures are encountered. The powders which yield disks having strength indices above 1.4 are useful when coalesced into such articles as gears, bearings, mechanical seals, etc. It should be understood that the strength index is a measurement of only one useful property and that polyimide articles having a high strength index may not always be better for every use than those at the low end of the range. For the purpose of the present invention, polyimide particles displaying a strength index of 0.3–5.5 are preferred. The strength index range of 0.3 to 5.5 corresponds to a tensile strength range of about 500 to about 50,000 p.s.i.: over this range there is an approximately linear relationship between index and tensile strength.

The procedures for testing the polyimide powders and the products fabricated therefrom follow:

SURFACE AREA

Surface areas were measured by adsorption of nitrogen from a gas stream of nitrogen and helium at liquid nitrogen temperature, using the technique described by F. M. Nelsen and F. T. Eggertsen (Anal. Chem. 30, 1387 (1958)). Sample weights are in the order of 0.1–3.0 g. The thermal conductivity detector is maintained at 40° C. and the flow rate of gas is approximately 50 ml./min. The mixture used is 10 parts by weight nitrogen and 90 parts by weight helium.

Samples are purged with the nitrogen-helium mixture at room temperature.

Adsorption peaks are generally used for the determinations, since tailing effects are more pronounced upon desorption. Calculation of surface area is done as described by Nelsen and Eggertsen. The values of surface area obtained corresponded closely to values obtained using the classical B.E.T. method (S. Brunauer, P. H. Emmett and E. Teller. JACS 60,309 (1938)).

STRENGTH INDEX

Fabrication of the test specimen

Two and one-half grams (2.5 gms.) of high surface area polyimide are weighed out for each disk to be fabricated and added to the mold case. This is lightly tamped or shaken to a level load before completing the assembly of the case. Two mil copper disks are used above and below the resin charge to prevent sticking to the metal parts.

Each mold case is provided with its own heater of 750 w. capacity which is fitted tightly to the case. The loading piston is spirally grooved to reduce the contact area by one-half and to assist in providing a path for any gas loss during molding and facilitating smooth easy motion when it is pressed through the case as a means of ejecting the molded specimens. A recessed backup block is used for the ejection operation, providing sufficient bottom room for the respective pieces.

Each band heater is powered through a variable transformer at approximately 8.5 amps at 115 v. and is controlled by a "Pulse Pyrovane" controller set at 490° C. and controlled by an I. C. thermocouple. The I.C. thermocouple well is $\frac{1}{16}''$ in diameter, $\frac{1}{32}''$ from the inside wall and is $3\frac{1}{4}''$ deep.

The mold case, after charging is placed on an insulating plate prepared from $\frac{1}{8}''$ "Transite," a second $\frac{1}{8}''$ "Transite" plate is placed on the mold piston. These are used to minimize heat losses to the press platens during the fabrication cycle.

Fabrication cycle

A 20 ton capacity "Preco" press is used for the coalescing operation. The assembled mold case with resin charge is placed between the insulated platens and wrapped with approximately $\frac{5}{8}''$ of soft glass wool insulation, and the press closed until resin is loaded to 2000 p.s.i.

The mold case is now heated to 500° C. ("Pyrovane" controlling at 490° C.); 18–20 min. is required for this operation and pressure is held at 2000 p.s.i. through heating cycle. Temperature is now held at control point for 5 min. and then pressure is rapidly increased to 20,000 p.s.i. Heat is cut immediately, insulation is removed and a strong air blast is directed at the mold case effecting cooling to 125° C. in approximately 10 minutes. Cooling to lower temperatures does not affect the finished piece, but equipment can be safely handled with cotton gloves at this temperature as the outside is considerably cooler than the temperature at the control point. The pieces are now pressed out. They consistently will run from 70 to 90 mils in thickness.

Evaluation of specimen

The chip is placed across a circular support having an $1\frac{1}{16}$ in. slot and is loaded by a triangular cross section bar slightly longer than the diameter of the disk with the contact edge having a radius of $\frac{1}{32}$ in. The load is applied slowly until the chip fails and breaks. The bar is driven by a 4 in. diameter Meade air clamp and the air pressure required to break the sample is divided by the square of sample thickness to give a number which is called the strength index.

$$\text{Strength index} = \frac{\text{p.s.i. to break}}{(\text{thickness in mils})^2 \times 10^{-3}}$$

The invention will be more clearly understood by referring to the examples which follow. These examples, which illustrate specific embodiments of the present invention, should not be construed to limit the invention in any way.

For convenience, abbreviations will be used wherever possible. Thus, DDP represents 4,4'-diamino-diphenyl propane; PP, benzidine; POP, 4,4'-diamino-diphenyl ether; PMDA, pyromellitic dianhydride; and DMA, N,N-dimethylacetamide.

The preparations of some of the important ingredients used in the examples are given below:

4,4'-diamino-diphenyl propane was prepared by condensation of aniline hydrochloride and acetone according to the method described in German Patent 399,149.

4,4'-dinitrodiphenyl ether was prepared by condensation of p-chloronitrobenzene with the sodium salt of p-hydroxynitrobenzene. This was reduced with hydrogen in the presence of a suitable hydrogenation catalyst to give 4,4'-diaminodiphenyl ether. The diamine was purified by recrystallization from butanol.

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide (DMAC) were purified by fractional distillation from phosphorous pentoxide or by other procedures suitable for removing water or peroxides; a fraction distilling at 47.5° C. and 17 mm. pressure is N,N-dimethylformamide and a fraction distilling at 73° C. and 30 mm. pressure is N,N-dimethylacetamide.

Unless stated otherwise, the inherent viscosity of polyamide-acid was obtained using a 0.5% solution in DMA at 35° C. and the inherent viscosity of polyimide was obtained using a 0.5% solution in a 1:1 mole ratio mixture of water and sym-dichlorotetrafluoroacetone at 35° C.

EXAMPLE 1

4,4'-diamino-diphenyl propane, 10.35 g., and pyromellitic dianhydride, 10.0 g., were weighed into a beaker and mixed. The solid mixture was added to 75 ml. of dimethylformamide with stirring and cooling (water jacket ca. 11° C.). After the solids had dissolved, the solvent solution obtained had an inherent viscosity as measured in a 0.5% solution of DMA of 0.74 at 30° C. The polyamide-acid solution was diluted with 50 ml. of dimethylformamide and then 5.5 ml. of triethylamine was added.

A portion of the casting dope containing the triethylamine was poured into a mixture of acetic anhydride (50 ml.) and pyridine (120 ml.) in a Waring Blendor and stirred for 30 minutes. A yellow precipitate was obtained. The reaction appeared to be complete within 5 minutes. The precipitate was filtered, washed with benzene, and dried at 120° C. in a vacuum for 120 minutes. The infrared spectra of the powder showed it to be a polyimide powder.

EXAMPLE 2

A freshly prepared solution of 4.0046 g. of highly purified 4,4′-diamino-diphenyl ether (POP) in 40 ml. of highly purified DMA was added rapidly to a freshly prepared solution of 4.3624 g. of highly purified PMDA in 75 ml. of DMA, using good agitation. It is convenient to prepare the solutions in a dry, inert atmosphere, such as nitrogen. A quantitative transfer was made; the last traces of diamine solution were washed into the mixture with 15 ml. of DMA. The viscosity of the solution increased and stirring was continued for approximately one hour. The polyamide-acid had an inherent viscosity of 2.36.

The solution of the polyamide-acid was then precipitated and partially converted to polyimide by running the solution into a high speed blender which contained a mixture of 300 ml. toluene, 60 ml. pyridine and 25 ml. acetic anhydride. Approximately 0.1 g. LiCl had been dissolved in the pyridine prior to mixing. LiCl appears to improve uniformity of precipitation. Agitation was continued for approximately 15 minutes, after which the polymer was filtered free of liquid and washed by suspending it in acetone in a blender. After filtering and drying the polymer it was suspended in acetic anhydride and heated to reflux. It is convenient to let refluxing continue overnight. The polymer was then filtered off, washed with acetone, dried in air or under vacuum, and then heated under nitrogen at 325° C. for 16 hours. The resulting polyimide had an inherent viscosity of 0.79. It was coalesced into a chip of strength index of 3.5. The surface area of the polyimide powder was approximately 2 to 3 square meters/gram.

EXAMPLE 2A

A mixture containing 30 weight percent of microfilm lubricant grade graphite and 70 weight percent of the high surface area polyimide derived from the intermediates pyromellitic dianhydride (PMDA) and 4,4′-diamino-diphenyl ether (POP) in the manner described in Example 2, was made by rolling a closed container in which the graphite and polymer had been placed. A sample of this mixture was coalesced under standard conditions to give a strong solid piece. When tested for bearing applications this coalesced mixture proved to be a superior material for unlubricated bearings in that its wear and frictional characteristics were excellent even at high speeds and under high loads.

EXAMPLE 2B

A mixture of 25% aluminum powder with 75% of the high surface area polyimide based on PMDA-POP was made and coalesced according to the directions in Example 2A. The electrical resistance of this coalesced material had been decreased from that of the pure polyimide ($10^{16}$ ohm-cm.) to about one ohm-cm. Other similar experiments indicate that coalesced mixtures containing varying aluminum contents can be useful for resistors since resistance is a function of the relative proportions used.

EXAMPLE 2C

A mixture of 50% silicon carbide (400 grit) with 50% high surface area polyimide powder based on PMDA-POP was made and coalesced into a small grinding wheel the same way as described in Example 2A. The coalesced polymer mixture in the form of a grinding wheel was found to be strong, heat resistant, and capable of grinding stainless steel rapidly despite the small grit size and without excessive loading of the disk surface.

EXAMPLE 3

Polymer was prepared as in Example 2, using the same highly purified monomers and solvent. A solution of 4.3188 g. of PMDA in 60 ml. DMA and a solution of 4.0046 g. POP in 50 ml. DMA were used. Transfer was completed with 10 ml. DMA. The polyamide-acid had an inherent viscosity of 1.6. The precipitant mixture used consisted of 150 ml. toluene, 30 ml. pyridine (containing approximately 0.05 g. LiCl) and 15 ml. acetic anhydride. The polymer was collected, washed, refluxed in acetic anhydride, and heated under nitrogen as described in Example 2. The polyimide had an inherent viscosity of 0.78 and a surface area of approximately 4 square meters/gram. It was coalesced into a chip displaying a strength index of 2.9.

EXAMPLE 4

A polymer was prepared from highly purified monomers and solvent by simultaneously running a solution of 12.0138 g. POP in 125 ml. DMA and a solution of 12.8328 g. PMDA in 175 ml. DMA into a third container. A 50 ml. sample of DMA was used to rinse in the last traces of the solutions. The entire preparation was carried out in a dry nitrogen atmosphere. The polyamide-acid had an inherent viscosity of 0.96. It was precipitated with partial conversion of polyimide using 1 liter toluene, 195 ml. pyridine (containing 0.2 g. LiCl) and 75 ml. acetic anhydride. The precipitate was washed, refluxed in acetic anhydride, and heated in nitrogen as described in Example 2 to form the polyimide. The polyimide had an inherent viscosity of 0.85 and a surface area of approximately 6 to 7 square meters/gram. It was coalesced into a chip of 2.8 strength index.

EXAMPLE 5

A polymer was prepared as described in Example 2, using a solution of 4.0572 g. of PMDA in 60 ml. of DMA and a solution of 4.0046 g. of POP in 50 ml. DMA. Transfer was completed with 10 ml. DMA. The inherent viscosity was 0.62. It was precipitated with partial conversion to polyimide using 300 ml. toluene, 60 ml. pyridine (with 0.1 g. LiCl) and 25 ml. acetic anhydride, then washed, refluxed in acetic anhydride, and heated under nitrogen as described in Example 2. The polyimide had an inherent viscosity of 0.61 and a surface area of 5 square meters/gram. It was coalesced into a chip of 1.8 strength index.

EXAMPLE 6

A polymer was prepared as described in Example 2 from a solution of 3.9264 g. of PMDA in 60 ml. DMA and a solution of 4.0046 g. of POP in 50 ml. DMA. Transfer was completed with 10 ml. DMA. The polyamide-acid had an inherent viscosity of 0.48. It was precipitated and treated as described in Example 2. The polyimide had an inherent viscosity of 0.57 and a surface area of approximately 4 to 5 square meters/gram. It was coalesced into a chip of 2.1 strength index.

EXAMPLE 7

A polyamide-acid was prepared as described in Example 2 using 12.0138 g. of POP and 12.8328 g. of PMDA dissolved in 125 ml. DMA and 175 ml. DMA, respectively. A 50 ml. portion of DMA was used to complete the transfer of one solution into the other. The polyamide-acid had an inherent viscosity of 1.07. A portion of the polyamide-acid solution was diluted to twice its vloume with DMA and precipitated by running it into a blender filled with toluene. Excess solvent was decanted and the precipitate was washed with fresh toluene in the blender. The precipitate was dried and heated under a stream of nitrogen at 100° C. overnight, then by raising the temperature to 325° C. for 8 hours. The polymer was not soluble in a 1:1 mole ratio mixture of sym-dichlorotetrafluoroacetone and water. It was coalesced into a chip of 2.0 strength index. The surface area of the polyimide powder and 5.4 square meters/gram.

EXAMPLE 8

Charged to a large glass-lined kettle were 207.2 g. (0.95 mole) sublimed PMDA, 200 g. (1.0 mole) sublimed POP, and 5.0 liters of DMA of high purity. The mixture was stirred for 2 hours while nitrogen was vigorously passed through it. Inspection showed solid still to be present. Stirring was continued for 1½ hours longer to complete dissolution. The inherent viscosity of the polyamide-acid solution was determined as 0.82 (measured as 0.46 g. solids in 100 ml. DMA at 35° C.).

Precipitation and partial conversion of the polyamide-acid to the polyimide was effected by piping the solution from the reaction vessel into a rapidly stirred mixture of 3 gal. toluene, 2.3 liter pyridine (containing 3.1 g. LiCl), and 920 ml. acetic anhydride. The addition required 7 min.; stirring was continued for 10 minutes. The finely divided precipitate was filtered and washed with 5 gal. acetone in the conversion kettle, then filtered and air dried.

The particulate, polymeric solid next was heated as a suspension in acetic anhydride at reflux overnight, filtered, washed with acetone several times in a blender, and air dried. To insure complete removal of acetone the material was heated in a vacuum oven overnight at 120° C.

A final heat treatment was given the polymer before molding (325° C. for 16 hours). This thermal treatment was in air. The surface area of the polyimide powder obtained was approximately 7 square meters/gram. It was coalesced into a chip of 2.4 strength index.

EXAMPLE 9

A polyamide-acid was prepared by mixing a solution of 1.8021 g. POP and 0.1842 g. benzidine (PP) dissolved in 30 ml. DMA with a solution of 2.1812 g. PMDA dissolved in 30 ml. DMA. Transfer was completed with 10 ml. DMA. The mixture was stirred for ½ hour and inherent viscosity was determined as 0.71. The polyamide-acid was precipitated and partially converted into polyimide by running it into a Waring Blendor containing 300 ml. toluene, 60 ml. pyridine (containing 0.1 g. LiCl) and 25 ml. acetic anhydride. The precipitated polymer was refluxed overnight with acetic anhydride, then heated at 325° C. for 16 hours. The particulate polyimide had an intrinsic viscosity greater than 0.1. The surface area was 2 square meters/gram. It was coalesced by heat and pressure, as previously described, into a chip of 2.8 strength index.

EXAMPLE 10

In a flask under an inert atmosphere were placed 3.2718 g. PMDA, 1.2409 g. bis(3,4-dicarboxyphenyl) ether anhydride, 4.0046 g. POP and 120 ml. DMA. After these were completely in solution, stirring was continued for 3 hours. At this point 0.2962 g. phthalic anhydride was added and stirring was continued for 2 hours after it had completely dissolved.

The resulting polyamide-acid had an inherent viscosity of 0.61. It was precipitated and partially converted to polyimide by running it into a high speed blender containing 750 ml. toluene, 150 ml. pyridine and 60 ml. acetic anhydride. The precipitated powder was refluxed in acetic anhydride for 8 hours, then heated in air at 340° overnight. The polyimide powder was then coalesced into a chip of 1.5 strength index.

EXAMPLE 11

A polyamide-acid of inherent viscosity 2.0 was prepared from PMDA and POP in DMA by the procedure described in Example 2. The 6.8% solids solution was diluted to 3% solids by addition of DMA. A 400 ml. sample was then run into a Waring Blendor containing 1 liter of n-heptane, 200 ml. of pyridine, and 80 ml. of acetic anhydride. After addition was complete, stirring was continued for 18 minutes. The mixture became warm. After cooling to room temperature excess solvent was decanted and the precipitate was filtered off, washed three times with acetone, and heated at 300° for three hours under nitrogen. The surface area of the resulting polyimide was 2 square meters/gram. It was coalesced into a chip of strength index well above 0.3.

EXAMPLE 12

A 3.1978 g. sample of bis-(3,4-dicarboxyphenyl) ether dianhydride was mixed with 3.0136 g. of 1,3-bis-(p-aminophenoxy) benzene in a flask. To this was added 200 ml. of DMA. The mixture was stirred until solution was complete, and stirring was then continued for half an hour. The polyamide-acid had an inherent viscosity of 0.83.

The DMA solution was diluted with 100 ml. of tetrahydrofuran, and was then treated with cyclohexane, with shaking, until incipient precipitation occurred. This solution was then run into a Waring Blendor containing 400 ml. of anhydrous diethyl ether. The precipitate was washed three times with fresh ether, filtered off, dried, and converted to polyimide by slowly heating to 350° C. under nitrogen. The resulting fine powder was coalesced into an amber chip at 350° C. that displayed a strength index greater than 0.3.

The polyimide particles of this invention find many applications. The useful combination of the desirable electrical, physical and chemical characteristics of these polymers is unique. Since fabricated parts of these polyimide particles retain their strength and excellent response to work-loading at elevated temperatures for prolonged periods of time, they offer commercial utility in a wide range of end uses. The polyimide polymers of this invention are distinguished in having excellent resistance to corrosive atmospheres. These polymers resist melting upon exposure at high temperatures (many of them over 500° C.) for extended periods while retaining hitherto unrealized high proportions of room temperature physical properties. Because of the unusual and surprising ability of the high surface area particles to coalesce at a temperature below the crystalline melting point under heat and pressure, these polymers may be processed into many desirable articles not obtainable by any other means.

The aromatic polyimide powders of this invention are also useful in combination with other materials such as finely-divided metals, metal oxides, minerals, synthetic inorganic compounds, abrasive powders, glasses, and other high temperature polymers such as polytetrafluoroethylene. The above materials can be incorporated as suspensions in the polyamide-acid solutions so that they will be intimately mixed with the high surface area polyimide particles made from the polyamide-acid solutions in accord with the process of this invention. The finely-divided solids can also be incorporated by mixing with the finished polyimide powders as by tumbling together. Graphite improves the frictional characteristics and finely-divided aluminum makes the coalesced solid polyimide article conductive. Many inorganic fillers improve the stiffness of coalesced polyimide articles. Strong, rigid cellular structures or foams which are very useful for high temperature insulation can be prepared by mixing the polyimide powders with a finely-divided, water-soluble salt such as sodium chloride, coalescing the mixture into a sheet (or other shape), and then leaching out the salt with water.

Coalescence of the polyimide powders, either alone or with added fillers such as graphite, clays, or abrasives, by the method of fabrication described earlier for making the billets used as test pieces, can be used to make standard shapes such as rods, tubes, and sheets which can be machined into a variety of articles. Likewise the coalescence fabrication technique previously described can be used to form directly from the polyimide powders, either alone or with added powders, such articles as bushings, seal faces, electric insulators, compressor vanes and impellers, pistons and piston rings, gears, thread guides, cams, brake linings, clutch faces, and abrasive articles such as wheels. In some applications, such as abrasive articles, as little as 5–10% by weight of the polyimide is required to provide an effective binder for the particulate inorganic solid and will provide a strong article. The properties of these coalesced aromatic polyimides make them outstanding in shaped articles for each of the above uses.

Having fully disclosed the invention, what is claimed is:

1. A process for preparing a particulate, finely-divided solid of at least one polyimide which comprises the steps of:
   (A) reacting at least one diamine having the structural formula $H_2N-R'-NH_2$, wherein $R'$ is a divalent radical containing at least two six-carbon atom rings, each ring characterized by benzenoid unsaturation, and in which no more than one valence bond is located on any one of said rings, with at least one aromatic tetracarboxylic acid dianhydride the reaction being carried out in an organic solvent for at least one of the group consisting of said diamine and said dianhydride, said organic solvent being inert to the system, to form a solution of a polyamide-acid soluble in said solvent;
   (B) adding a precipitant for said polyamide-acid to precipitate a particulate, polymeric solid and then
   (C) treating said particulate, polymeric solid with a lower, fatty, monocarboxylic acid anhydride to convert said particulate polymeric solid to a particulate solid of polyimide insoluble in said solvent.

2. A process as in claim 1 wherein the diamine is selected from the group consisting of benzidine, 4,4'-diaminodiphenyl propane, 4,4'-diamino-diphenyl methane, 4,4'-diamino-diphenyl ether, 4,4'-diamino-diphenyl sulfone, and 4,4'-diamino-diphenyl sulfide.

3. A process as in claim 1 wherein the dianhydride is pyromellitic dianhydride.

4. A process as in claim 1 wherein the precipitant is a mixture of a lower fatty acid anhydride and a tertiary amine.

5. A process as in claim 1 wherein the precipitant is a liquid hydrocarbon having at least 3 carbon atoms.

6. A process as in claim 1 wherein the precipitant is a mixture of a liquid hydrocarbon having at least 3 carbon atoms, a lower fatty acid anhydride and a tertiary amine.

7. A process as in claim 4 wherein the lower fatty acid anhydride is acetic anhydride and the tertiary amine is pyridine.

8. A process as in claim 6 wherein the hydrocarbon is toluene, the lower fatty acid anhydride is acetic anhydride and the tertiary amine is pyridine.

9. A process as in claim 1 wherein the particulate solid of polyimide is heated to a temperature in the range of 200° C. to about 500° C. for at least 15 seconds.

10. A process for preparing a particulate, finely-divided solid of at least one polyimide which comprises the steps of:
    (A) reacting at least one diamine having the structural formula $H_2N-R'-NH_2$, wherein $R'$ is a divalent radical containing at least two six-carbon atom rings, each ring characterized by benzenoid unsaturation, and in which no more than one valence bond is located on any one of said rings, with at least one aromatic tetracarboxylic acid dianhydride, the reaction being carried out in an organic solvent for at least one of the group consisting of said diamine and said dianhydride, said organic solvent being inert to the system, to form a solution of a polyamide-acid soluble in said solvent;
    (B) adding a precipitant for said polyamide-acid to precipitate a particulate, polymeric solid and
    (C) heating said particulate, polymeric solid at a temperature above 50° C. to complete conversion of said particulate, polymeric solid to a particulate solid of polyimide insoluble in said solvent.

11. A process as in claim 10 wherein the diamine is selected from the group consisting of benzidine, 4,4'-diamino-diphenyl propane, 4,4'-diamino-diphenyl methane, 4,4-diamino-diphenyl ether, 4,4'-diamino-diphenyl sulfone and 4,4'-diamino-diphenyl sulfide.

12. A process as in claim 10 wherein the dianhydride is pyromellitic dianhydride.

13. A process as in claim 10 wherein the diamine is 4,4'-diamino-diphenyl ether and the dianhydride is pyromellitic dianhydride.

14. A process as in claim 10 wherein the precipitant is a mixture of toluene and acetic anhydride.

15. A process as in claim 10 wherein the precipitant is a mixture of toluene, acetic anhydride and pyridine.

16. Solid particles of polyimide, said polyimide having the recurring unit

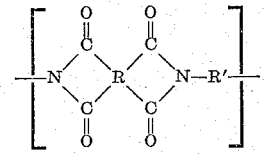

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical, and wherein $R'$ is a divalent radical containing at least two six-carbon atom rings, each ring characterized by benzenoid unsaturation, and in which no more than one of the valence bonds is located on any one of said rings, said particles having an average surface area of 2–500 square meters per gram.

17. Solid particles of polyimide, said polyimide having the recurring unit

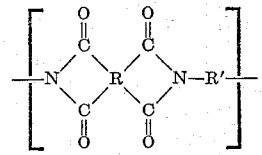

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical, and wherein $R'$ is a divalent radical containing at least two six-carbon atoms rings, each ring characterized by benzenoid unsaturation, and in which no more than one of the valence bonds is located on any one of said rings, said particles having an average surface area of 2–500 square meters per gram and when coalesced into disk form by applying a pressure of from 3,000 to about 30,000 p.s.i. to said particles in a mold, said particles having been heated to a temperature in the range of 200° to about 500° C., but below the crystalline melting point of the polyimide prior to the application of pressures in excess of 5,000 p.s.i. having a strength index greater than 0.3.

18. Particles of polyimide as in claim 16 wherein R is the tetravalent radical of dianhydrides of the group consisting of pyromellitic dianhydride, 2,2-bis(3,4-dicarboxyphenyl) propane dianhydride, bis(3,4-dicarboxyphenyl) sulfone dianhydride and bis(3,4-dicarboxyphenyl) ether dianhydride.

19. Particles of polyimide as in claim 16 wherein $R'$ is the divalent radical of diamines selected from the group consisting of benzidine, 4,4'-diamino-diphenyl propane, 4,4'-diamino-diphenyl methane, 4,4'-diaminodiphenyl ether, 4,4'-diamino-diphenyl sulfone, 4,4'-diamino-diphenyl diethylsilane, 4,4' - diamino - diphenyl phenylphosphine oxide, 4,4'-diamino-diphenyl N-methyl-amine and 4,4'-diamino-diphenyl sulfide.

20. Solid particles of polyimide, said polyimide having the recurring unit

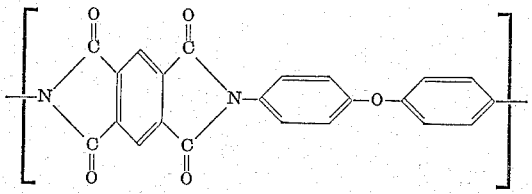

said polyimide having an inherent viscosity of at least 0.1 when measured as a 0.5% solution in the monohydrate of dichlorotetrafluoroacetone at 35° C., and said particles of polyimide having a surface area of between 2 and 500 square meters per gram.

21. A process for the fabrication of shaped articles from the solid particles of polyimide of claim 16 comprising the steps of applying a pressure of from 3,000 to about 30,000 p.s.i. to said particles in a mold, said particles having been heated to a temperature in the range of 200° to about 500° C., but below the crystalline melting point of the polyimide prior to the application of pressures in excess of 5,000 p.s.i., and subsequently ejecting the coalesced polyimide in the form of a shaped article.

22. A shaped article comprising the coalesced solid particles of a polyimide, said polyimide having the recurring unit

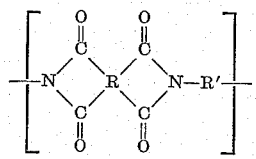

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical, and wherein R' is a divalent radical containing at least two six-carbon atom rings, each ring characterized by benzenoid unsaturation, and in which no more than one of the valence bonds is located on any one of said rings, said particles having an average surface area of 2–500 square meters per gram and having been coalesced by applying a pressure of from 3,000 to about 30,000 p.s.i. to said particles in a mold, said particles having been heated to a temperature in the range of 200° to about 500° C., but below the crystalline melting point of the polyimide prior to the application of pressures in excess of 5,000 p.s.i.

23. A shaped articles comprising the coalesced solid particles of a polyimide, said polyimide having the recurring unit

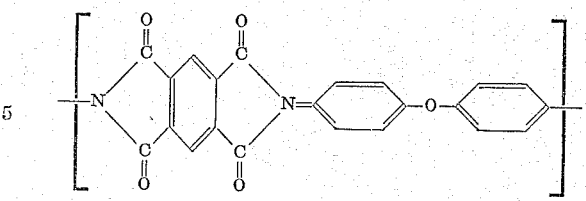

said polyimide having an inherent viscosity of at least 0.1 when measured as a 0.5% solution in the monohydrate of dichlorotetrafluoroacetone at 35° C., and said particles of polyimide having a surface area of 2–500 square meters per gram and having been coalesced by applying a pressure of from 3,000 to about 30,000 p.s.i. to said particles in a mold, said particles having been heated to a temperature in the range of 200° to about 500° C., but below the crystalline melting point of the polyimide prior to the application of pressures in excess of 5,000 p.s.i.

24. A grinding wheel comprising the combination of abrasive powder and the coalesced particles of polyimide, said polyimide having the recurring unit

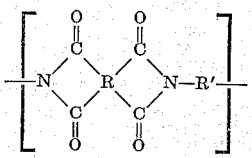

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in the radical, and wherein R' is a divalent radical containing at least two six-carbon atom rings, each ring characterized by benzenoid unsaturation, and in which no more than one of the valence bonds is located on any one of said rings, said particles having an average surface area of 2–500 square meters per gram and having been coalesced by applying a pressure of from 3,000 to about 30,000 p.s.i. to said particles in a mold, said particles having been heated to a temperature in the range of 200° to about 500° C., but below the crystalline melting point of the polyimide prior to the application of pressures in excess of 5,000 p.s.i.

References Cited by the Examiner
UNITED STATES PATENTS

| | | | |
|---|---|---|---|
| 2,071,250 | 2/37 | Carothers | 260—78 |
| 2,710,853 | 6/55 | Edwards et al. | 260—78 |
| 2,712,543 | 7/55 | Gresham et al. | 260—78 |
| 2,731,447 | 1/56 | Gresham et al. | 260—78 |
| 2,880,230 | 3/59 | Edwards et al. | 260—78 |
| 2,900,369 | 8/59 | Edwards et al. | 260—78 |
| 3,049,518 | 8/62 | Stephens | 260—78 |

WILLIAM H. SHORT, *Primary Examiner.*

LOUISE P. QUAST, *Examiner.*